US006710553B2

(12) United States Patent
Logan

(10) Patent No.: US 6,710,553 B2
(45) Date of Patent: Mar. 23, 2004

(54) SWITCHING DEVICE FOR CONTROLLING A LAMP FROM BOTH A WALL SWITCH AND THE LAMP'S SWITCH

(76) Inventor: James D. Logan, 81 Castle Hill Rd., Windham, NH (US) 03087

( * ) Notice: Subject to any disclaimer, the term of this patent is extended or adjusted under 35 U.S.C. 154(b) by 30 days.

(21) Appl. No.: 10/160,859

(22) Filed: May 31, 2002

(65) Prior Publication Data

US 2002/0180367 A1 Dec. 5, 2002

Related U.S. Application Data

(60) Provisional application No. 60/295,468, filed on Jun. 1, 2001.

(51) Int. Cl.[7] .............................. G05F 1/00; H02B 1/24

(52) U.S. Cl. ......................... 315/291; 315/360; 315/56; 315/136; 307/112; 307/113; 307/114

(58) Field of Search .............................. 315/56, 57, 59, 315/136, 129, 360, 361, 291; 307/112, 113, 114, 115

(56) References Cited

U.S. PATENT DOCUMENTS 3,872,319 A * 3/1975 Platzer, Jr. .................. 307/114
3,928,737 A * 12/1975 Lopsadhayoodh ..... 200/51 LM
4,383,186 A * 5/1983 Liang ......................... 307/113
5,574,319 A * 11/1996 Bennett ...................... 307/114

* cited by examiner

*Primary Examiner*—Tuyet T. Vo
(74) *Attorney, Agent, or Firm*—Charles G. Call

(57) ABSTRACT

A control circuit for operating a lamp or other electrically operated device using a conventional wall socket outlet that is selectively energized under the control of a conventional wall mounted switch. To permit the lamp to be independently controlled using either the wall switch or the lamp switch, a wall adapter unit is employed that plugs into the wall outlet and into which the lamp's power cord is plugged. Sensing means are employed to detect the operation of either the wall switch or the lamp switch to control an electrically operated switch which turns the lamp ON and OFF whenever either the wall switch or the lamp switch are operated. Different embodiments are provided for use with conventional electrical wiring and with either a conventional lamp or lamp incorporating additional circuitry to adapt it for use with the wall socket adapter.

16 Claims, 2 Drawing Sheets

SWITCHING DEVICE FOR CONTROLLING A LAMP FROM BOTH A WALL SWITCH AND THE LAMP'S SWITCH

CROSS-REFERENCE TO RELATED APPLICATION

This application claims the benefit of the filing date of the now abandoned U.S. Provisional Patent Application Ser. No. 60/295,468 filed on Jun. 1, 2001.

FIELD OF THE INVENTION

This invention relates to electrical power supply control circuitry and more particularly to a control for controlling a lamp or other electrical device using either the device's ON/OFF switch or a remote wall switch which controls the energization of a conventional electrical outlet which supplies power to the device.

BACKGROUND OF THE INVENTION

In household electrical systems, it is common to supply a wall outlet with electrical power through a wall switch positioned near an entryway. A lamp may then be plugged into the switched wall outlet. If the switch at the lamp is left on, the lamp can be turned on and off from the wall switch. This allows a person entering a dark room to turn on the lamp from the wall switch and avoids the need to search for the lamp switch in the dark.

Commonly, however, it is more convenient to turn the lamp off using the switch near the lamp. As a result, when the person leaves and later re-enters the room after dark, an attempt to turn on the lamp at the wall switch fails. Also, if the wall switch is turned off, the lamp cannot be turned on using the lamp switch. The bedside lamp illustrates the problem. While it is convenient to turn the lamp on using the wall switch when entering the room after dark, it is more convenient to use the switch near the lamp to turn the lamp off when retiring. As a result, in the morning when the room is well lit by daylight, the bedside lamp switch is typically left switched off. Thus, at nighttime when the room is reentered, the wall switch can't be used to turn the lamp on again.

It would thus be desirable to provide a switching mechanism device that can be used to control a lamp that is plugged into a switched outlet from either the wall switch or the lamp switch.

For ease of installation and to limit expense, it would further be desirable to provide a field installable control device that can be used without requiring modification to the wall switch, the lamp, or the lamp switch, or alternatively to provide a new lamp fixture that can be used without modifying the wall switch or other parts of the existing wiring.

SUMMARY OF THE INVENTION

The present invention takes the form of methods and apparatus for controlling a lamp or other electrically operated device that is connected to receive electrical power from a conventional electrical wall outlet socket energized under the control of a manually actuated wall-mounted switch. The lamp or other device is controlled by a second manually actuated switch located at the electrically operated device. In accordance with the invention, an electrically controlled switch is connected between the wall outlet socket and electrically operated device and is controlled by the combination of a first control signal produced whenever the wall-mounted switch is actuated and a second control signal produced whenever the second switch is actuated. A control circuit actuates the electrically operated switch in response to both the first and the second control signals such that the electrically powered device can be independently controlled by actuating either the manually-actuated wall mounted switch or the second manually actuated switch located at said utilization device.

The first control signal may be generated by a voltage detector connected to the wall outlet to sense when the voltage delivered through the wall mounted switch changes. The second control signal may be produced by applying a low-level DC control voltage across the series combination of the device and the second switch, and then sensing the resulting current through the second switch when it's ON.

In one embodiment of the invention, in which the electrically operated device is powered from the switched wall outlet terminals, an alarm device is actuated whenever either the manually operated wall switch or the second manually operated switch at the device is left in the OFF position.

The control circuit which actuates the electrically operated switch may be implemented with a state memory device having at least two states, the state memory device being connected to change state in response to either the first or the second control signal and to operate the electrically operated switch whenever it changes state.

The invention may advantageously take the form of a control adapter for connecting an electrical device to a standard electrical outlet that is connected to a source of electrical power through a wall-mounted switch having ON and OFF positions. A female socket mounted on the adapter housing receives the device's standard male electrical power supply plug and a male adapter plug on the adapter housing plugs into the switched wall outlet. In one such arrangement, the power from the switched wall outlet is supplied to the connected electrical device under the control of the electrically operated switch. In an alternative arrangement, a second male plug on the housing connects to an unswitched socket on the wall outlet, and electrical power from the second plug is supplied to the connected device through the electrically operated switch.

In a further embodiment, an outlet adapter including male plugs for establishing electrical connections to a power source and for sensing the state of the wall switch is used with a device adapter which includes the second manually operated switch and connectors which permit the device adapter to be electrically connected between the wall adapter and the device.

These and other objects, features and advantages of the invention will be more clearly understood by considering the following detailed description of a preferred embodiment of the invention. In the course of this description, frequent reference will be made to the attached drawings.

DETAILED DESCRIPTION

One preferred embodiment of the invention takes the form of a control adapter that plugs into a conventional switched electrical outlet and into which includes a female power socket into which the power cord of conventional lamp is plugged. This control adapter monitors the output voltage level delivered by the switched outlet and monitors the impedance presented by the switched lamp load. The control adapter includes a two-state controllable switch, which in turn controls the flow of electrical energy to the connected lamp. A momentary interruption in outlet supply voltage (created by toggling the wall switch OFF momentarily) is interpreted as a state change command, which changes the ON/OFF state of the controllable switch. Similarly, a momentary increase in the impedance presented by the switched lamp when the switch at the lamp is momentarily turned OFF also changes the ON/OFF state of the controllable switch. When the controllable switch is in the ON state, momentarily toggling either the wall switch or the lamp switch to the OFF position and ON again will turn the lamp OFF. When the controllable switch is in the OFF state, momentarily toggling either the lamp switch or the wall switch OFF and then ON again will turn the lamp ON.

If either the wall switch or the lamp switch is inadvertently left in the OFF position, the lamp cannot be turned ON from either switch. To prevent either switch from being left in this position, the preferred embodiment of the invention includes an audio generator for emitting an audible, distinctive sound which alerts the user to the fact that the switch just operated was not properly returned to its ON position within a predetermined time interval.

The control adapter preferably includes a male, two-pronged power input plug which can be inserted into a standard switched wall outlet and exposes, on the housing face, a two-slot female socket for receiving a standard lamp cord plug. The adapter may be used without requiring any modification whatsoever to either the wall switch, the lamp or the lamp switch, and can be installed without tools by simply plugging the adapter into the switched outlet and plugging the lamp into the adapter. A volume control may be included to permit the user to adjust the volume level of the warning sound.

Figure 1:
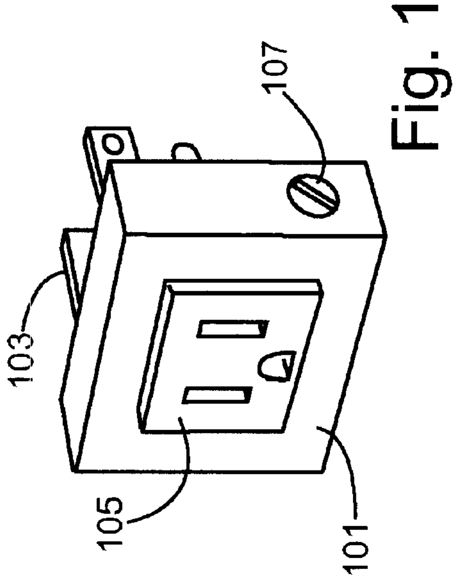
FIG. 1 is a perspective view of a lamp control adapter, which implements the invention.

As seen in FIG. 1, a lamp control adapter that embodies the invention may advantageously take the form of an adapter unit 101 which includes an outwardly extending male plug 103 adapted to mate with and plug into a standard household three-conductor wall socket. A female socket seen at 105 is adapted to receive a two or three conductor male plug of a lamp. A slotted adjustment screw head seen 107 is accessible for manual adjustment from the outside of the adapter 101.

Figure 2:
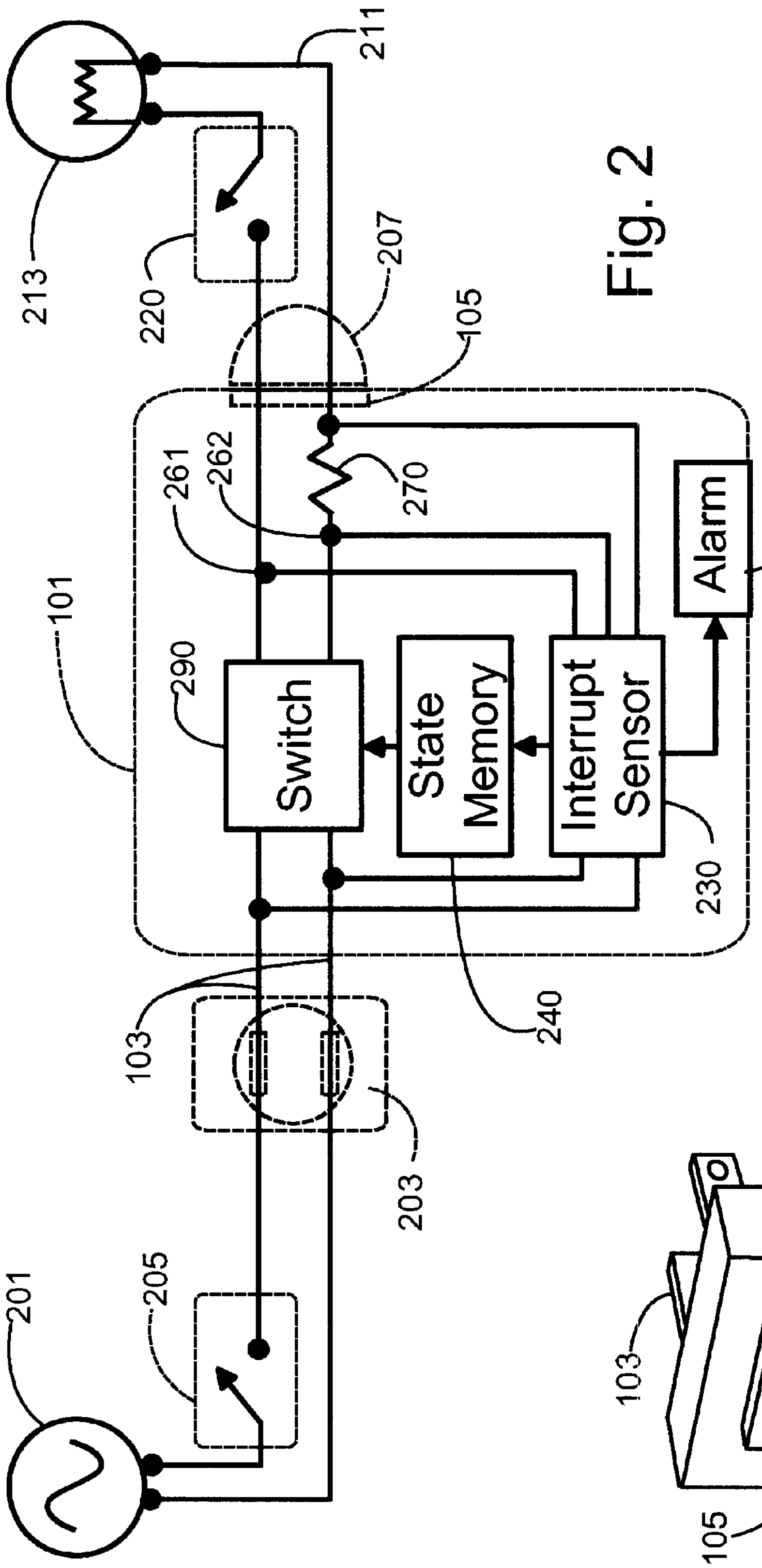
FIG. 2 is a schematic block diagram showing the manner in which the internal components of the control adapter are interconnected with the switched electrical outlet and the lamp.

As seen in FIG. 2, the male plug conductors 103 of the adapter 101 are connected to a switched source of electrical power 201 through a household socket seen at 203. A single-pole, single-throw wall switch 205 is serially connected with one of the conductors, which connects the socket 203 to the power source 201. The male plug 207 at one end of a lamp power cord 211 connects a lamp bulb 213 to the adapter 101. A single-pole, single-throw lamp switch 220 is serially connected with one conductor of the power cord 211.

The adapter 101 includes an interrupt sensor circuit 230, which monitors the line voltage from the switched power source applied between the input conductors at the input plug 103. When the wall switch 205 is turned OFF momentarily, and then ON again, the interrupt sensor circuit 230 applies an input signal to a state memory circuit 240, changing its state. Similarly, the interrupt sensor circuit monitors the impedance presented by the lamp load at the terminals of the socket 105. When the lamp switch 220 is momentarily turned OFF and then ON again, the interrupt sensor circuit 230 applies an input signal to the state memory circuit 240, changing its state. The interrupt sensor circuit 230 works by applying a small DC potential across the terminals 261 and 262 to induce a current flow through the external lamp switch 220 and the filament in lamp bulb 213. The resulting DC potential developed across the low resistance 270 connected in series with the power cord 211 is proportional to the DC current flow, which drops to zero when the lamp switch is opened. This loss of DC voltage is converted into a state change signal applied to the state memory circuit 240. Note that, because the adapter must provide control functions even when the wall switch 205 is open, it should include its own power source in the form of a battery or a capacitor for storing energy at least for a duration sufficient to operate the alarm 295 described below.

The state memory 240 toggles between an ON state and an OFF state each time the interrupt sensor circuit 230 detects either a momentary loss of applied voltage at the input plug terminals 103 when the wall switch 205 is momentarily turned OFF, or a momentary loss of the DC sensing current flowing through the sensing resistance 270 when the lamp switch is momentarily turned OFF. The state of state memory 240 controls the conductivity of an AC solid state power switch 290 to turn the lamp bulb 213 ON or OFF based on the state of the memory circuit 240.

A logic timing circuit (not shown) in the interrupt sensor 230 senses any loss of input voltage at the input plug terminals 103 for longer than a predetermined delay interval (e.g. 1–3 seconds), as well as any loss of lamp load DC sensing current for a similar predetermined delay interval. In this way, if either the wall switch 205 or the lamp switch 220 is left OFF instead of being returned to its ON position, an audio tone generator (shown as the alarm 295 in FIG. 2) is activated to warn the user that the switch just operated has been improperly left in the OFF position. An accumulating capacitor (not shown) may be used to store sufficient electrical energy to operate the alarm 295 for a brief interval after the supply power is terminated by leaving the wall switch 205 in the OFF position. The volume control set screw 107 seen in FIG. 1 may be used to set the volume of the alarm signal to a level desired by the user if the preset level is deemed to be too loud or too soft.

Figure 3:
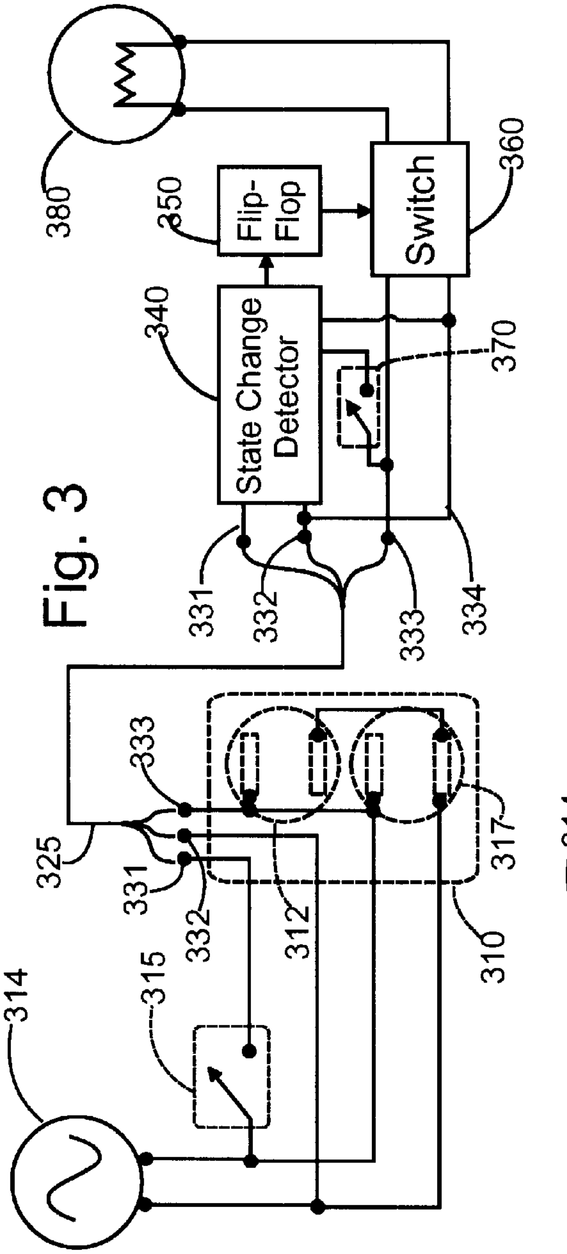
FIG. 3 is a schematic block diagram of a second embodiment of the invention using control circuitry built into the lamp and a power supply adapter plug which mates with a standard wall outlet.
Figure 4:
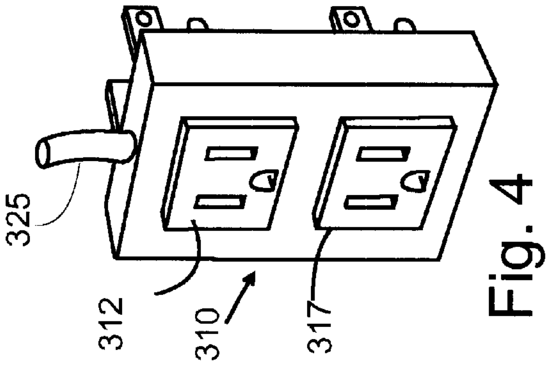
FIG. 4 is a perspective view of a power supply adapter plug that may be used to implement the arrangement shown in FIG. 3.

In an alternative arrangement shown in FIGS. 3 and 4 of the drawings, the lamp control circuit is built into the lamp and eliminates the need to “toggle” the wall switch and the lamp switch to change the ON-OFF state of the lamp. As seen in FIG. 3, an adapter pass-through plug and socket seen at 310 (which may take the physical form shown pictorially in FIG. 4) plugs into a standard two-socket wall outlet, one socket of which is connected to the AC power source 314 by via a wall switch 315, and other socket of which is unswitched and connected directly to the power source 314. As seen in FIG. 4, the adapter 310 is provided with two male plugs, which plug into the existing household wall socket. The adapter also exposes a pair of pass-through sockets 312 and 317, both of which are connected to the unswitched electrical supply as seen schematically in FIG. 3. The female sockets 312 and 317 can thus provide power to other electrical devices (clocks, radios, vacuum cleaners, etc.).

The adapter further connects a three-wire lamp cord 325, two conductors 331 and 332 of which are connected across the switched socket terminals of the outlet and the other conductor 333 and the shared conductor 332 are connected across the unswitched socket terminals of the outlet and are hence always connected to the power source 315. The lamp control circuit comprises a state change detector 340, a flip-flop circuit 350 and a solid state power switch 360. The state change detector 340 monitors the switched output voltage across the lamp cord conductors 331 and 332, which indicates the ON-OFF position of the wall switch 315. A lamp switch seen at 370 positioned at some location near the lamp bulb 380 is also connected to the state change detector 340. Changing the ON-OFF position of either the wall switch 315 or the lamp switch 370 causes a detectable voltage change which is translated by the state change detector 340 into a switching pulse which is applied to the flip-flop 350 to change its state. The state of the flip-flop 350 controls the ON-OFF state of the solid state power switch 360 to turn the lamp 370 ON or OFF.

The alternative arrangement shown in FIGS. 3 and 4 does not require the user to "toggle" the wall and lamp switches to switch the lamp ON and OFF, nor does it require an alarm device to remind the user to leave either the wall switch 315 or the lamp switch 370 ON. Either switch can be used to turn ON or OFF the lamp at any time. The lamp manufacturer can implement the invention by providing an adapter having the appearance illustrated in FIG. 4 with the remaining circuitry seen at the right in FIG. 3 being built into the lamp fixture. No special household wiring is required.

Figure 5:
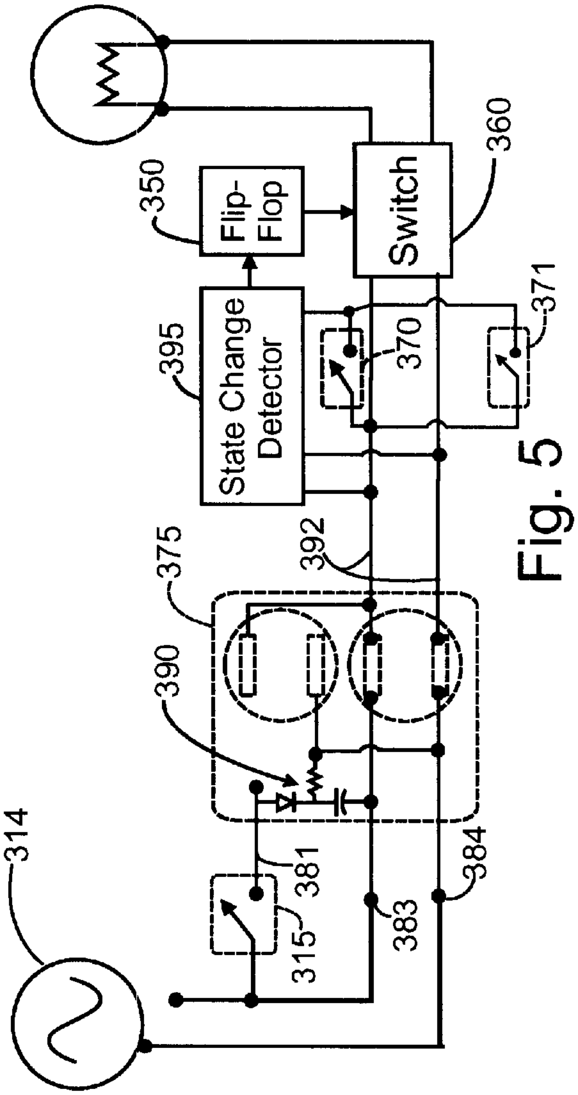
FIG. 5 is a schematic block diagram of a third embodiment of the invention using control circuitry built into the lamp.

The control arrangement seen in FIGS. 3 and 4 may be modified as shown in FIG. 5 to eliminate the need for a two-wire lamp cord. As seen in FIG. 5, a pass-through adapter socket 375 (having same general appearance as the adapter 310 seen in FIG. 4, but without the conductors 325) exposes two female sockets, both of which are directly connected to an unswitched source of AC power applied to the input plug conductors 383 and 384. As seen at 390, a diode is connected in series with the parallel combination of a capacitor and a resistance between the switched conductor 381 from the wall switch 315 and the common conductor 383. Whenever the wall switch 390 is turned ON, a small DC pilot voltage is applied across both female sockets.

The lamp and its control circuit may be plugged into either female socket. In FIG. 5, a two-line lamp cord 392 is shown plugged into the lower socket of the wall socket adapter. At the control circuit, a modified state change detector 395 detects changes in the DC pilot voltage applied across the conductors of the input line cord 392 when the wall switch 315 is ON. The detector 395 also detects the state of the lamp switch 370. Thus, using only a two-line lamp cord 392 plugged into either socket of the adapter 375, the control circuit seen in FIG. 5 switches the lamp ON and OFF whenever either the wall switch or the lamp switch is operated.

Figure 6:
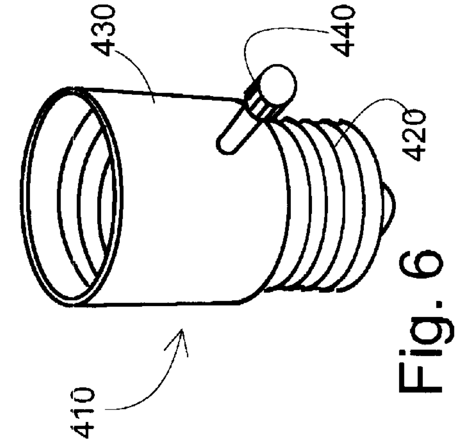
FIG. 6 is a perspective view of a lamp socket adapter for holding the components shown in either FIG. 3 or FIG. 5.

The components shown in either FIG. 3 or FIG. 5; that is, either state change detector 340 or 395, the flip-flop 350 and the electronically controlled switch 360, as well as the manually operated switch 370 may be mounted inside a lamp socket adapter of the type shown generally at 410 in the perspective view of FIG. 6. The adapter 410 includes a threaded bayonet base 420 sized to mate with a conventional lamp bulb socket and an upper socket housing 430 which receives a conventional lamp bulb. A knob 440 extends radially outward from the socket housing 430 and operates the manual switch 370 seen in FIG. 5. The combination of the outlet mounted adapter shown in FIG. 4 which houses the circuitry at the left in FIG. 5, with the remaining electronic components being mounted in a socket adapter of the type illustrated in FIG. 6, allows a conventional lamp to make use of the invention by simply plugging the outlet adapter of FIG. 4 into the wall outlet, plugging the lamp's electrical cord into the outlet adapter, screwing the base 420 of socket adapter of FIG. 6 into the lamp socket (not shown), and then screwing the bulb 380 into the socket housing 440.

Note that the manually switch knob 440 may be replaced by a wireless signal receiver that can control the lamp in response to the manipulation of a remote control device. This receiver can advantageously take the form of an infrared or wireless link using the IrDA Protocol (www.irda.org) or the Bluetooth Protocol (www.bluetooth.com) respectively. Because a Bluetooth integrated circuit is capable of uniquely identifying itself, many different lamps, each equipped with its own adapter socket of the type shown in FIG. 6, may be independently controlled from a Bluetooth remote control transmitter.

The manually operated switch knob 440 may alternatively control an electronic dimmer. Using conventional electronic dimmer circuitry in which an electronic switch is turned ON and OFF during each half-cycle of the AC supply voltage at a phase angle that is varied in response to the adjustment of the know 440, an electronic dimming capability can be substituted for the electronic ON and OFF switch shown in FIG. 4 at very little additional cost.

The embodiment of the invention shown in FIGS. 3 and 5 can control the lamp state in response to multiple switches. For example, one or more additional switches can be connected in parallel with the switch 370 as illustrated at 371. If all of these switches operate as momentary contact switches which supply a triggering pulse to the state change detector each time they are operated, the flip-flop 350 may change state to change the lamp's ON-OFF state each time any of the switches is operated. This permits, for example, a first switch to located near the bulb socket of a bedside table lamp, a second switch to be located on the base of the table lamp, and a third switch to be located on the lamp's cord, and actuation of any of these switches, as well as the wall switch 315, would operate to the lamp.

As contemplated by the invention, a mechanism is used in an intelligent control circuit that is associated with a powered device for sensing the state of a conventional external control device (in this instance, a wall switch). The same principle can be applied to other utilization devices and external controls. For example, ceiling fans and other devices which are advantageously operated from either a wall switch or a switch on the device may be controlled in the same way. When a wall-mounted dimmer control is used to vary the brightness of a lamp, a second dimmer at the lamp could be used in combination with a level detector circuit to control the lamp's brightness from either control. Whenever the setting of one of the dimmers changes, that dimmer would be given control of lamp brightness which would be set to a new level until either of the dimmer controls was again adjusted. Either of the two controls could be programmed to change the light level at preset times of the day or days of the week (for example, to turn lights ON or OFF automatically when the homeowner is away from home) in order to discourage burglary.

The invention may be used to particular advantage in hotel rooms or other public facilities where the people who use the lamps or other devices controlled from both the device and a wall switch may be unfamiliar with the location of switches. This would eliminate the frustration of guests who must often locate and determine the "combination" of two switches that must both be turned ON to operate a bedside lamp or other device.

If the wall switches all had intelligence and were networked together (using DC pilot signals, or signals having unique identification frequencies applied to the power line), then lamp switches could do more than just turn on and off the attached lamp. For example, by using the switch at a bedside lamp, all the room's lights might be turned ON or OFF. The lamp switch could operate only that lamp when operated normally, but could control other lamps and devices when rapidly toggled.

An adaptive learning system may be employed in which several lamps or other devices are placed in a desired state (some ON and some OFF) before a unique command signal is sent. All of the circuits would then "learn" this command and would revert to that programmed state whenever the unique command was received later. As an alternative, the user might operate a control to place the controlled devices in different ON-OFF state combinations and, when a desired combination is found, it could be remembered and later selected by pressing one of several push-button or dialed alternatives, or by sending a command signal to the network from a remote source by telephone, wireless transmission, or the Internet.

The control circuit can be further enhanced by including means for identifying burned-out bulbs. In the arrangement shown in FIG. 1, in which the ON-OFF state of a lamp switch is monitored by passing a DC current through the series combination of the lamp switch and the lamp to detect the ON-OFF toggling of the lamp switch, an annunciator is sounded to indicate when the lamp switch is left OFF. This same circuit will also signal the condition when the lamp bulb is burned out since that condition also creates an open circuit. The same pilot signal may be employed in the circuit of FIG. 2 to detect a burned out lamp condition. In addition to the audible tone annunciator shown in FIG. 1, a variety of other mechanisms may be used to signal the burned out bulb condition, such applying a unique frequency tone to the household wiring that may detected by a remote condition sensor. Another mechanism, which may be used to alert maintenance personnel of the need to replace burned out bulbs, is described next.

Email Condition Signaling

In a commercial environment, such hotel rooms or offices, as well as a household, maintenance personnel or emergency services may need to be notified of trouble conditions. Devices such as malfunctioning appliances or electronic equipment may include mechanisms detecting trouble conditions, and the capability described above for automatically detect burned out lamps is but one example. There is accordingly a need for a simple and effective way to notify maintenance and emergency services of trouble conditions. To meet this need, a general purpose email signaling mechanism may be installed on a personal computer which will automatically transmit an email message having preprogrammed content identifying the trouble condition to one or more target email addresses.

The novel arrangement comprises the combination of a hardware interface adapter coupled to an input port on a personal computer, and a resident program installed on the computer which can be activated by the interface adapter when a trouble condition is detected to automatically send and email message describing that trouble condition to one or more predetermined email addresses.

The hardware interface adapter includes input connections adapted to receive signals from external devices and sensors, which indicate a trouble condition. When an alarm condition is received (e.g. a burned out bulb on a particular lamp), the hardware interface adapter sends a coded signal to a hardware signal input on a connected PC. For example, the hardware interface adapter may be connected to the PC's serial port. When an alarm condition arises, the adapter raises applies a predetermined bit pattern to serial port to which the UART in the PC responds by issuing a processor interrupt to initiate an interrupt handling routine that executes on the PC. The interrupt handling routine retrieves one or more coded character values from the serial port that identify the specific external alarm condition raised. The interrupt handling routine then establishes a dialup or network Internet connection between the PC and SMTP server and transmits a predetermined email message to one or more predetermined email addresses.

Alternatively, the general purpose email program may be used in combination with a PC based automated control system, such as the X-10 system that uses household wiring and special adapter plugs to perform a wide variety of functions. The Lyn-X 10 PC Adapter card manufactured by Marrick Limited, Inc. of San Diego, Calif. provides a complete X-10 interface that can send and receive all X-10 commands to and from external devices under direct software control.

The general purpose email transmission program preferably includes a user interface routine for creating standard email messages as stored, named files in the PC's file system, and means for associating one or messages with the input alarm identification codes applied to the serial port by the interface adapter. In addition, the email transmission program further includes means for accepting from the user one or more email destination addresses for each of the possible alarm conditions that may arise.

Preferably, the email transmission program includes alarm means which may optionally be used alert the PC user of an alarm condition and allow the PC user to inhibit the transmission of the email messages if the trouble condition can be handled without the need to notify remote services. If desired, when alarm conditions arise they may create a local alarm or dialog box notification on the PC, with the email messages only being sent after a pre-programmed time has elapsed. When messages of an emergency character need to be sent (for example, when a smoke detector or a sprinkler system is triggered, or when a security system indicates that a potential burglary is in progress), the email message may be sent immediately. Government or private emergency services may be sent email or a third party service may receive the email message and act accordingly by calling the police or fire department and notifying the owner. As a supplement to the email transmission, the PC program may respond to selected emergency conditions by automatically placing a telephone call to an emergency service and then transmitting a recorded spoken message.

CONCLUSION

It is to be understood that the specific embodiment of the invention, which has been described, is merely illustrative of one application of the principles of the invention. Numerous modifications may be made to the arrangement described without departing from the true spirit and scope of the invention.

What is claimed is:

1. The method of controlling an electrically powered utilization device connected to receive electrical power from a conventional electrical wall outlet socket under the joint control of a manually actuated wall-mounted switch and a second manually actuated switch located at said utilization device and connected in series with said utilization device, said method comprising, in combination, the steps of:

connecting an electrically operated switching means between said electrical wall outlet socket and said electrically powered utilization device, generating a first control signal whenever said wall-mounted switch is actuated, generating a second control signal whenever said second switch at said utilization device is actuated by detecting a change in the amount of current flowing through the series combination of said second switch and said utilization device, operating said electrically operated switching means in response to both said first control signal and said second control signal such that said electrically powered utilization device is independently controlled by actuating either said manually-actuated wall mounted switch or said manually actuated switch located at said utilization device.

2. The method of controlling an electrically powered utilization device as set forth in claim 1 wherein said step of operating said electrically operated switching means in response to both said first control signal and said second control signal comprises the substeps of providing a state memory device having at least two states and the steps of operating said electrically operated switching means in response to both said first control signal comprises the substeps of:

providing a state memory device having at least two states, changing the state of said state memory device in response to said first control signal, changing the state of said state memory device in response to said second control signal, and operating said electrical operated switching means in response to changing the state of said state memory device.

3. The method of controlling an electrically powered utilization device as set forth in claim 1 wherein said step of generating a first control signal comprises detecting the level of voltage delivered to said electrical wall outlet socket via said manually-actuated wall mounted switch and generating said first control signal whenever said level of voltage changes.

4. The method of controlling an electrically powered utilization device as set forth in claim 3 wherein said second manually operated switch is connected in series with said utilization device and wherein said step of generating a second control signal comprises detecting a change in the amount of current flowing through the series combination of said second switch and said utilization device.

5. The method of controlling an electrically powered utilization device as set forth in claim 1 wherein said manually-actuated wall mounted switch has ON and OFF positions and wherein said method further comprises the step of producing an alarm signal whenever said wall mounted switch is in said OFF position for more than a predetermined time duration.

6. The method of controlling an electrically powered utilization device as set forth in claim 5 wherein said second manually-actuated switch has ON and OFF positions and wherein said method further comprises the step of producing an alarm signal whenever said second manually actuated switch is in the OFF position for more than a predetermined time duration.

7. A control adapter for connecting an electrical device to a standard electrical outlet which is connected to a source of electrical power through a wall-mounted switch having ON and OFF positions, said electrical device comprising a male electrical power supply plug connected to the series combination of a load circuit and a device switch having ON and OFF positions, said control adapter comprising:

a housing, a male adapter plug comprising connectors extending outwardly from said housing and adapted to plug into and establish an electrical connection with said standard electrical outlet, a female socket mounted on said housing to receive said male electrical power supply plug, a control circuit having an ON state and an OFF state, first sensing means mounted within said housing and connected to said male adapter plug for changing the state of said control circuit whenever said wall mounted switch changes between its ON and OFF positions second sensing means mounted within said housing and connected to said female socket for changing the state of said control circuit whenever said device switch changes between its ON and OFF positions, and an electrically operated switch mounted within said housing for applying electrical power to said female socket whenever said control circuit is in its ON state.

8. The control adapter set forth in claim 7, wherein said first sensing means detects the level of voltage applied to said male adapter plug from said standard electrical outlet.

9. The control adapter set forth in claim 8 wherein said second sensing means detects the impedance presented by said series combination of said load circuit and said device switch.

10. Apparatus for controlling the operation of an electrical device which is supplied with electrical energy from a conventional electrical outlet, said electrical outlet being selectively energized in response to the operation of a conventional wall-mounted manual control, said apparatus comprising, in combination:

an outlet adapter including plug means for establishing electrical connections to said electrical outlet and sensing means for detecting the operation of said wall-mounted manual control to produce a first control signal, a manually operated device control located at and serially connected with said electrical device, a sensor for detecting a change in the amount of current flowing through the series combination of said second switch and said utilization device to produce a second control signal, and a control circuit coupled to said outlet adapter and said sensor for selectively energizing said electrical device in response to both said first control signal and said second control signal.

11. Apparatus as set forth in claim 10 wherein said sensing means for detecting the operation of said wall-mounted manual switch includes means for sensing the level of a voltage applied to said conventional electrical outlet in response to said conventional wall-mounted manual control.

12. Apparatus as set forth in claim 10 wherein said wall mounted manual control has ON and OFF positions and further including an alarm actuated whenever said wall mounted switch is in said OFF position for more than a predetermined time duration.

13. Apparatus as set forth in claim 10 wherein said manually operated device control located at said electrical device has ON and OFF positions and further including an alarm actuated whenever said manually operated device control is in the OFF position for more than a predetermined time duration.

14. Apparatus as set forth in claim 10 wherein said control circuit comprises, in combination, a state memory device having at least two states, first control means for changing the state of said state memory device in response to said first control signal, second control means for changing the state of said state memory device in response to said second control signal, and a power switching device connected to said state memory device for selectively energizing said electrical device in response to the state of said state memory device.

15. Apparatus as set forth in claim 10 wherein said electrical device is a lamp and wherein said control circuit selectively controls the level of illumination provided by said lamp in response to both said first control signal and the operation of said manually operated device control.

16. Apparatus as set forth in claim 15 wherein said control circuit and said manually operated device control together form a device adapter which further includes a female socket for receiving and establishing electrical connections to said lamp and for establishing an electrical supply connection to said outlet adapter.

* * * * *